United States Patent
Gindele et al.

(10) Patent No.: US 6,748,097 B1
(45) Date of Patent: *Jun. 8, 2004

(54) METHOD FOR VARYING THE NUMBER, SIZE, AND MAGNIFICATION OF PHOTOGRAPHIC PRINTS BASED ON IMAGE EMPHASIS AND APPEAL

(75) Inventors: Edward B. Gindele, Rochester, NY (US); Andreas E. Savakis, Rochester, NY (US); Stephen Etz, Venice, FL (US)

(73) Assignee: Eastman Kodak Company, Rochester, NY (US)

( * ) Notice: Subject to any disclaimer, the term of this patent is extended or adjusted under 35 U.S.C. 154(b) by 672 days.

This patent is subject to a terminal disclaimer.

(21) Appl. No.: 09/602,872

(22) Filed: Jun. 23, 2000

(51) Int. Cl.[7] .......................... G06K 9/00; B41B 15/00
(52) U.S. Cl. ........................................ 382/112; 358/1.2
(58) Field of Search ........................................ 382/112

(56) References Cited

U.S. PATENT DOCUMENTS

| | | | | |
|---|---|---|---|---|
| 5,162,899 A | * | 11/1992 | Naka et al. ................. | 358/518 |
| 5,418,895 A | | 5/1995 | Lee ........................... | 395/131 |
| 5,424,945 A | | 6/1995 | Bell ........................ | 364/419.2 |
| 5,694,484 A | | 12/1997 | Cottrell et al. ............... | 382/167 |
| 5,751,854 A | | 5/1998 | Saitoh et al. ................ | 382/218 |
| 5,796,428 A | | 8/1998 | Matsumoto et al. ........ | 348/231 |
| 5,835,627 A | * | 11/1998 | Higgins et al. ............. | 382/167 |
| 5,875,265 A | | 2/1999 | Kasao ........................ | 382/229 |
| 6,282,317 B1 | * | 8/2001 | Luo et al. .................... | 382/203 |
| 6,346,998 B2 | * | 2/2002 | Shiota et al. ................ | 358/487 |
| 6,389,169 B1 | * | 5/2002 | Stark et al. .................. | 382/225 |
| 6,522,418 B2 | * | 2/2003 | Yokomizo et al. .......... | 358/1.15 |
| 6,529,630 B1 | * | 3/2003 | Kinjo ......................... | 382/190 |
| 6,563,596 B1 | * | 5/2003 | Narushima .................. | 358/1.14 |

FOREIGN PATENT DOCUMENTS

| | | | | |
|---|---|---|---|---|
| EP | 0730368 | * | 4/1996 | .......... H04N/1/21 |
| EP | 0 730 368 A1 | | 9/1996 | .......... H04N/1/21 |
| EP | 1 109 132 A2 | | 6/2001 | .......... G06T/7/60 |

OTHER PUBLICATIONS

"A computational model of print–quality perception" by J. Tchan, R.C. Thompson, A. Manning. Expert Systems with Applications, No. 1999, Elsevier, UK, vol. 17, No. 4, pp. 243–256.

* cited by examiner

*Primary Examiner*—Leo Boudreau
*Assistant Examiner*—Hussein Akhavannik
(74) *Attorney, Agent, or Firm*—David M. Woods

(57) ABSTRACT

In a method for varying one or more print attributes of a print made from a digital image, a print attribute value is computed for the digital image based on a determination of the degree of importance, interest or attractiveness of the image and the resulting print attribute value is used to control a print attribute of the print made from the image. The print attribute value is derived from an emphasis or appeal value, wherein an appeal value is an assessment of each image taken by itself and the emphasis value is an assessment of each image in relation to other images in a group. In a typical embodiment, the print attribute is either the number of prints made of the image, the size of a print made from the image, or the magnification factor used for the image.

22 Claims, 12 Drawing Sheets

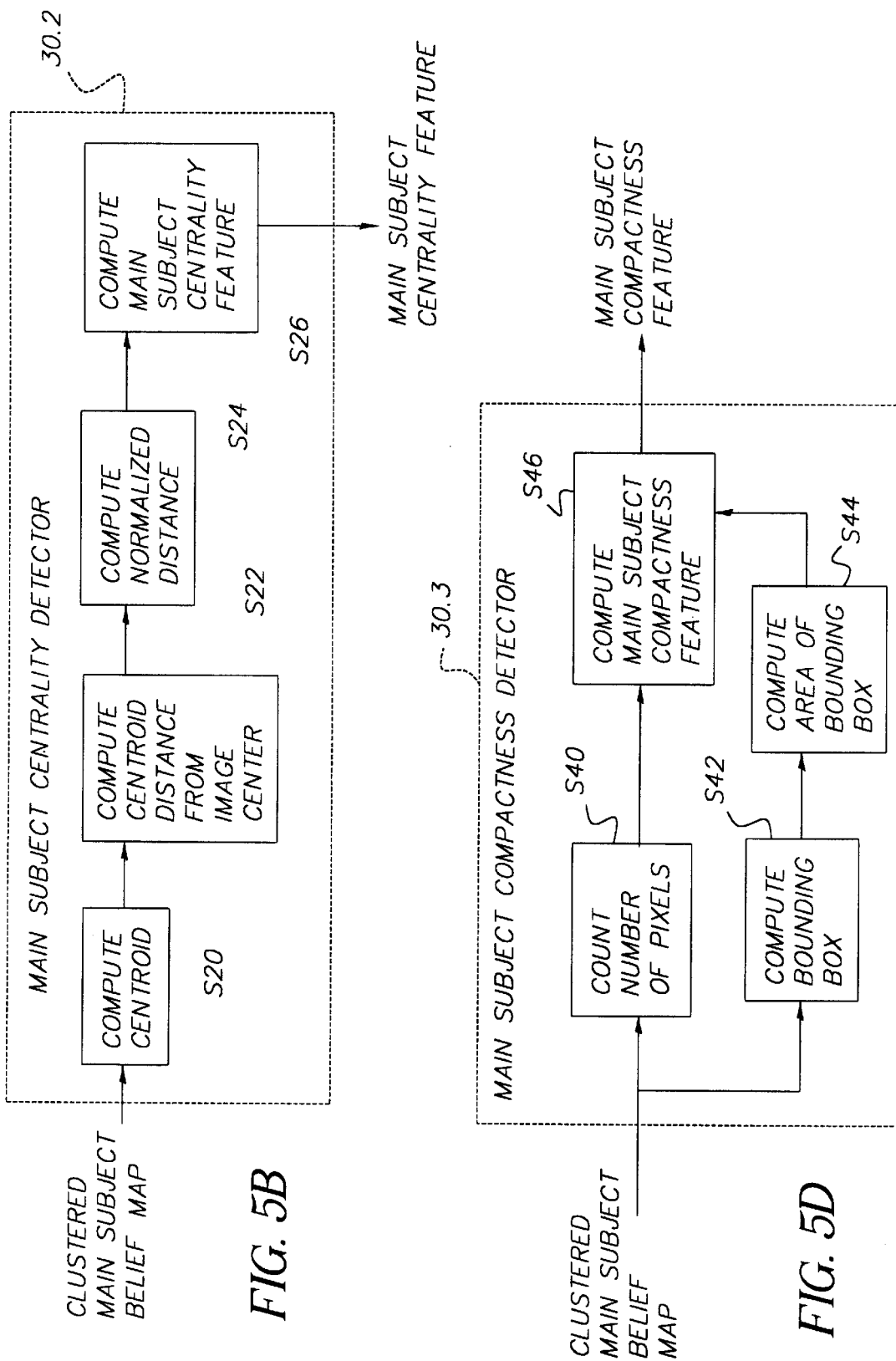

METHOD FOR VARYING THE NUMBER, SIZE, AND MAGNIFICATION OF PHOTOGRAPHIC PRINTS BASED ON IMAGE EMPHASIS AND APPEAL

FIELD OF THE INVENTION

The invention relates generally to the field of image processing, and in particular to the field of image assessment and understanding.

BACKGROUND OF THE INVENTION

Image assessment and understanding deal with problems that are easily solved by human beings given their intellectual faculties but are extremely difficult to solve by fully automated computer systems. Image understanding problems that are considered important in photographic applications include main subject detection, scene classification, sky and grass detection, people detection, automatic detection of orientation, etc. In a variety of applications that deal with a group of pictures, it is important to rank the images in terms of a logical order, so that they can be processed or treated according to their order. A photographic application of interest is automatic albuming, where a group of digital images are automatically organized into digital photo albums. This involves clustering the images into separate events and then laying out each event in some logical order, if possible. This order implies at least some attention to the relative content of the images, i.e., based on the belief that some images would likely be preferred over others.

A number of known algorithms, such as dud detection, event detection and page layout algorithms, are useful in connection with automatic albuming applications. Dud detection addresses the elimination, or de-emphasis, of duplicate images and poor quality images, while event detection involves the clustering of images into separate events by certain defined criteria, such as date and time. Given a set of images that belong to the same event, the objective of page layout is to layout each event in some logical and pleasing presentation, e.g., to find the most pleasing and space-efficient presentation of the images on each page. It would be desirable to be able to select the most important image in the group of images, e.g., the one that should receive the most attention in a page layout.

Due to the nature of the image assessment problem, i.e., that an automated system is expected to generate results that are representative of high-level cognitive human (understanding) processes, the design of an assessment system is a challenging task. Effort has been devoted to evaluating text and graphical data for its psychological effect, with the aim of creating or editing a document for a particular visual impression (see, e.g., U.S. Pat. Nos. 5,875,265 and 5,424,945). In the '265 patent, a system analyzes an image, in some case with the aid of an operator, to determine correspondence of visual features to sensitive language that is displayed for use by the operator. The difficulty in this system is that the visual features are primarily based on low level features, i.e., color and texture, that are not necessarily related to image content, and a language description is difficult is to use for relative ranking of images. The '945 patent discloses a system for evaluating the psychological effect of text and graphics in a document. The drawback with the '945 patent is that it evaluates the overall visual impression of the document, without regard to its specific content, which reduces its usefulness for developing relative ranking. Besides their complexity and orientation toward discernment of a psychological effect, these systems focus on the analysis and creation of a perceptual impression rather than on the assessment and utilization of an existing image.

Determining the number of copies of prints in an order usually implies at least some judgment about the images. Some optical and digital printing systems currently available have the capability of printing more than one print per input image. Typically, a double print option is bundled at the point of sale, which results in two prints produced for each image received. Digital image processing algorithms which analyze the pixel values of an original digital image, or a digital image derived from a photographic film negative, are also included in some printing systems for the purposes, in some circumstances, of rejecting the image altogeter. These types of algorithms evaluate an image and a decision is made to either print or not print the image. However, the same number of prints is made for all images which pass the evaluation test.

It is commonly understood that not all images from a set of images have the same esthetic value, and therefore may not be copied in the same number. Some working solutions for digital imaging applications have addressed this issue by including non-image pixel information with a digital image which indicates the number of prints requested. This information is then utilized by a digital printer to vary the number of prints made per image. Alternatively, a particular image within a set of images may be singled out manually by either the operator of the printing equipment or by the customer in order to specially enhance that particular image, making it more desirable and ultimately worthy of more copies. However, each of these techniques require user intervention. What is needed is an automatic digital imaging algorithm which can make an intelligent decision without user input as to the number of prints to be made.

SUMMARY OF THE INVENTION

The present invention is directed to overcoming one or more of the problems set forth above. Briefly summarized, according to one aspect of the present invention, a method is disclosed for varying one or more print attributes of a print made from a digital image, including the steps of (a) computing a print attribute value for the digital image based on a determination of the degree of importance, interest or attractiveness of the image, and (b) using the print attribute value to control a print attribute of the print made from the image. In a typical embodiment, the print attribute is either the number of prints made of the image, the size of a print made from the image, or the magnification factor used for the image.

From another perspective, the invention pertains to a method for varying one or more print attributes of a print made from a digital image composed of image pixels, including the steps of (a) computing a print attribute value for the digital image based on a determination derived from the image pixels; and (b) using the print attribute value to control either the number of prints made of the image, the size of a print made from the image, or the magnification factor used for the image.

In one embodiment, the print attribute value is based on an appeal value determined from the degree of importance, interest or attractiveness that is intrinsic to the image. In another embodiment, wherein the image is one of a group of digital images, the print attribute value is based on an emphasis value determined from the degree of importance, interest or attractiveness of the image relative to other images in the group of images.

The determination of the degree of importance, interest or attractiveness of an image is based on an assessment of the image with respect to certain features, wherein one or more quantities are computed that are related to one or more features in each digital image, including one or more features pertaining to the content of the individual digital image. The quantities are processed with a reasoning algorithm that is trained on the opinions of one or more human observers, and an output is obtained from the reasoning algorithm that assesses each image. In a dependent aspect of the invention, the features pertaining to the content of the digital image include either people-related features or subject-related features. Moreover, additional quantities may be computed that relate to one or more objective measures of the digital image, such as colorfulness or sharpness. The results of the reasoning algorithm are processed to rank order the quality of each image in the set of images. The print attributes applied to each digital image are varied based on the degree of importance, interest or attractiveness of the image, determined as by itself or as related to the group of digital images.

From another aspect, the invention may be seen (a) as a method for varying a printing parameter, e.g., the number of prints, based on a determination of the appeal of the image with respect to certain self-salient features, wherein appeal is an assessment of the degree of importance, interest or attractiveness of an individual image or (b) as a method for varying the same printing parameter for a digital image based on a determination of the emphasis of an image with respect to certain features, wherein emphasis is an assessment of the degree of importance, interest or attractiveness of an individual image relative to other images in a group of images. From this perspective, for both appeal and emphasis assessment, self-salient image features are calculated, such as:

a. People related features: the presence or absence of people, the amount of skin or face area and the extent of close-up based on face size.

b. Objective features: the colorfulness and sharpness of the image.

c. Subject related features: the size of main subject and the goodness of composition based on main subject mapping.

While the above-noted features are adequate for emphasis assessment, it is preferable that certain additional relative-salient image features are considered for appeal assessment, such as:

a. The representative value of each image in terms of color content.

b. The uniqueness of the picture aspect format of each image.

An assessment of an image is obtained with a reasoning engine, such as a Bayesian network, which accepts as input the above-noted features and is trained to generate image assessment values. This assessment may be an intrinsic assessment for individual images, in which case the self-salient features are processed by a Bayesian network trained to generate the image appeal values, or the assessment may be a relative assessment for a group of images, in which case the self-salient and, optionally, the relative-salient features are processed by a Bayesian network trained to generate image emphasis values.

The advantage of the invention lies in its ability to perform an assessment of one or more images and accordingly vary an attribute value, such as, but not limited to, the number of prints, the size of the prints, or the magnification of the prints, made of a digital image without human intervention. In a variety of applications that deal with a group of pictures, such an algorithmic assessment enables the automatic control of image processing, so that the images can be more efficiently processed and printed according to their rank order.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 5A–5D are detailed diagrams of the component methods shown in FIG. 3 for main subject detection;

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the method and system as shown and described according to the invention in the following materials, software not specifically shown, described or suggested herein that is useful for implementation of the invention is conventional and within the ordinary skill in such arts.

For purpose of this disclosure, a digital image may be thought of as including one or more digital image channels. Each digital image channel is comprised of a two-dimensional array of pixels, where each pixel value relates to the amount of light received by the imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two dimensional array of pixels values arranged by rows and columns, those skilled in the art will recognize that the present invention can be applied to mosaic (non rectilinear) arrays with equal effect. Moreover, the signals comprising each digital image channel may originate from a variety of capture devices, such as area or linear arrays.

Printing System

The present invention may be implemented in computer hardware.

Figure 11:
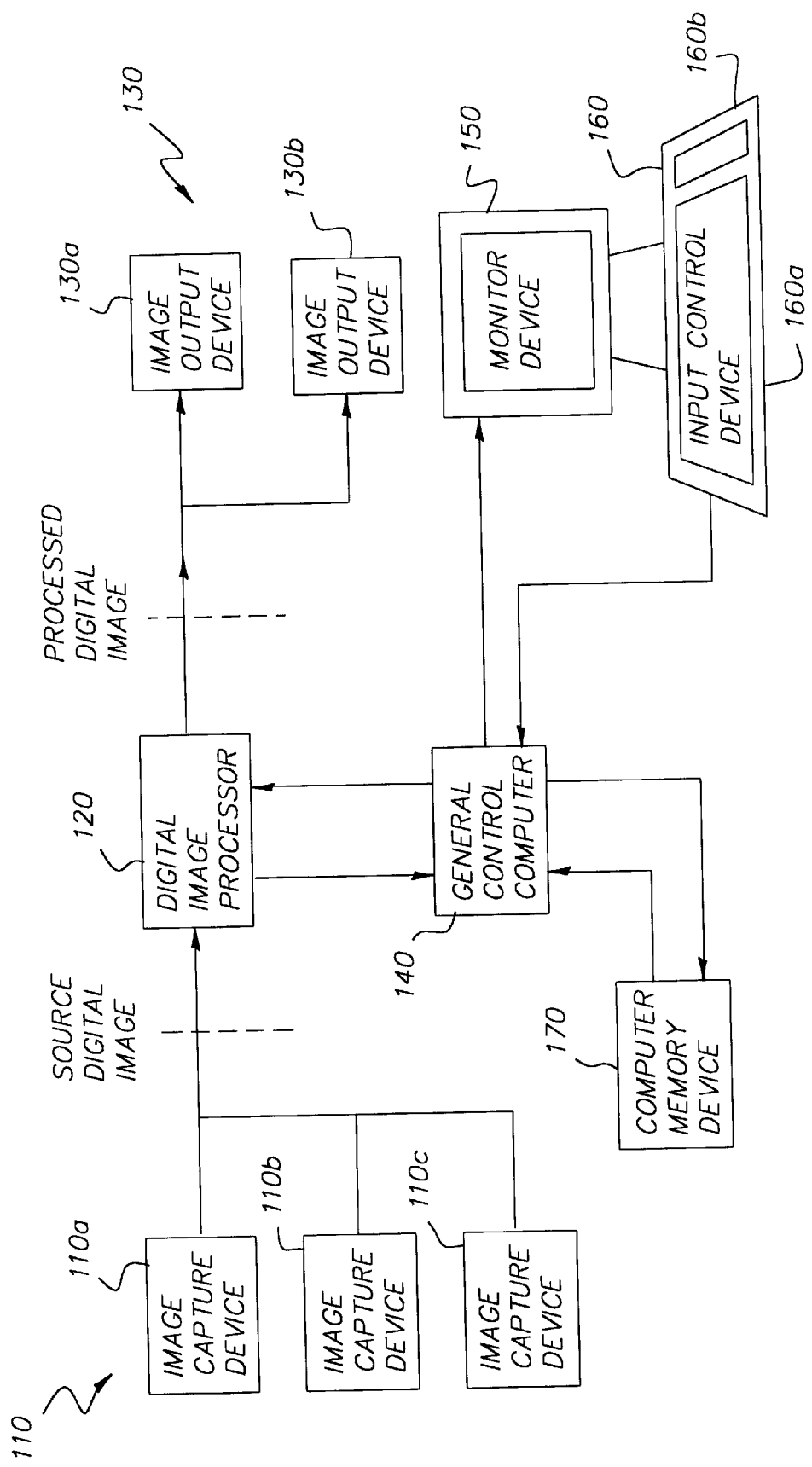
FIG. 11 is a block diagram of a computer system for practicing the invention using the components and methods set forth in the preceding Figures.

Referring to FIG. 11, the following description relates to a digital imaging system which includes one or more image capture devices 110, a digital image processor 120, one or more image output devices 130, and a general control computer 140. In a typical embodiment, the image output device 130 is a printing device, such as an ink-jet, laser or other form of electronic or digital printer. Those skilled in the art will recognize that the present invention may also be practiced with an analog optical printing system, wherein the image output device 130 may be an optical printer. The system may include a monitor device 150 such as a computer console or a paper printer (not shown). The system may also include an input control device 160 for an operator such as a keyboard 160a and/or a mouse pointer 160b. Still further, as used and disclosed herein, the present invention may be implemented as a computer program and may be stored in a computer memory device 170, i.e., a computer readable storage medium, which may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such as a personal computer.

Multiple capture devices 110 (shown in FIG. 11 as separate devices 110a, 110b and 110c) are shown to illustrate that the present invention may be used for digital images derived from a variety of imaging devices. For example, FIG. 11 may represent a digital photofinishing system where the image capture device 110 is a film scanner device which produces digital images by scanning a conventional photographic image, e.g., color negative film or slide film transparencies. The digital image processor 120 provides the means for processing the digital images to produce suitably looking images (e.g., pleasing looking or otherwise modified for a particular purpose) on the intended output device or media. Multiple image output devices 130 (shown as devices 130a and 130b) are shown to illustrate that the present invention may be used in conjunction with a variety of output devices, e.g., a digital photographic printer and/or a soft copy display. The digital image processor 120 adjusts the source digital images in a manner such that a suitably looking image is produced by the image output device 130. The interaction between these processing steps is explained in more detail below.

Figure 12:
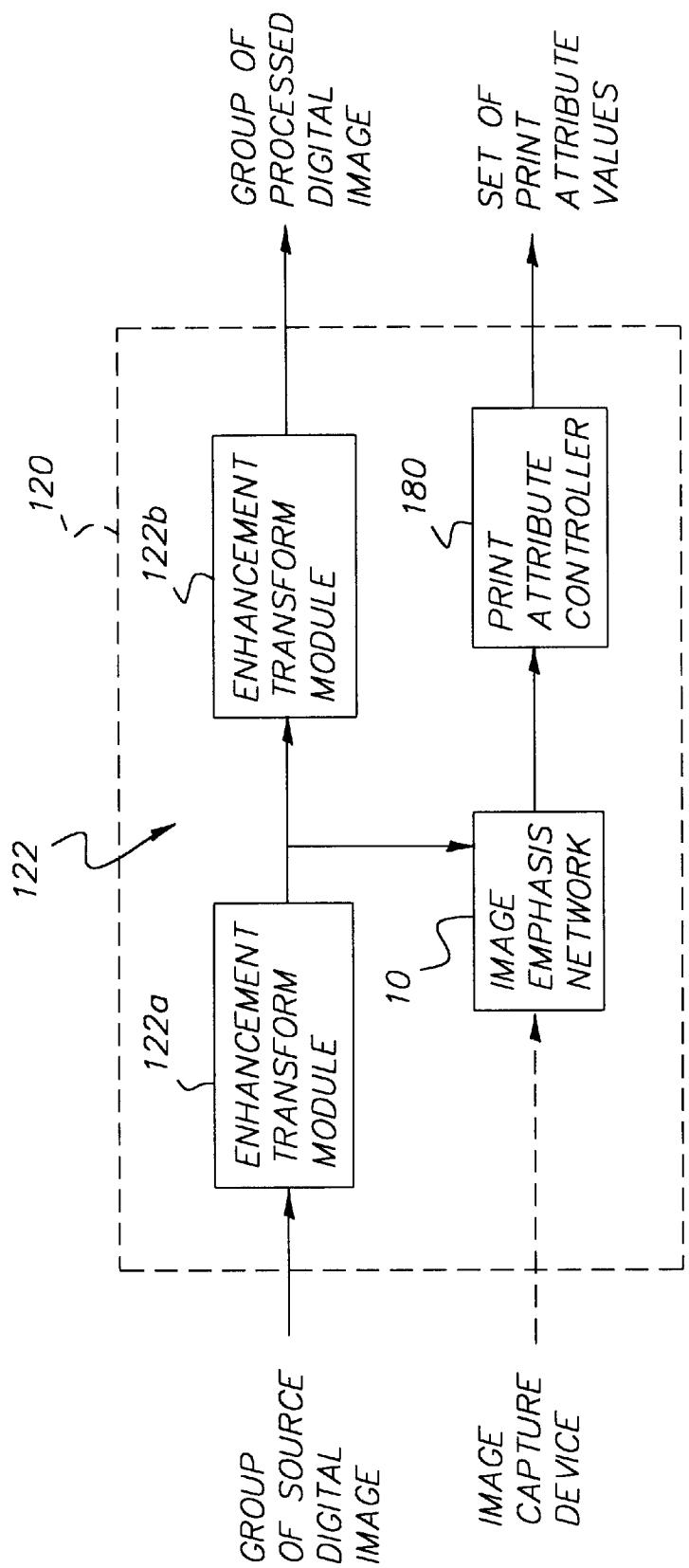
FIG. 12 is a block diagram showing further details of the image processing system set forth in FIG. 11 for practicing the invention.

The digital image processor 120 shown in FIG. 11 is illustrated in more detail in FIG. 12. The general form of the digital image processor 120 employed by the present invention contains a cascaded chain of image processing modules 122 (shown as two separate modules 122a and 122b). Each source digital image is received by the digital image processor 120, which produces an output processed digital image. Each image processing module 122 contained within the digital image processor 120 is adapted to receive a digital image, to modify the digital image or derive some information from the digital image, and provide its output processed digital image to the next image processing module. As shown in FIG. 12, the image processing module 122 includes, but is not limited to, two enhancement transform modules 122a and 122b to illustrate that the processor 120 can be used in conjunction with other image processing modules. Examples of enhancement transform modules 122a and 122b might include, but are not limited to, modules designed to sharpen spatial detail, remove noise, enhance color, and enhance the tone scale of a digital image.

Referring to FIG. 12, an image assessment network 10 receives a group of digital images from either the image capture device 110 shown in FIG. 11 or the output from the enhancement transform module 122a shown in FIG. 12. The image assessment network 10 calculates an assessment value, which is preferably a single numerical number, indicating the overall importance, interest or attractiveness of each digital image, either by itself or in relation to other images in a group of images, that is derived from the image pixels of the digital image. For analog optical printing applications, the assessment values indicate of the overall importance, interest or attractiveness of the individual original images that will be produced from the film negatives. The individual assessment value corresponding to each image taken by itself will be referred to as its appeal value, and the values thereof for all images as the set of appeal values. The individual assessment value corresponding to each image in relation to other images in the group of images will be referred to as its emphasis value, and the values thereof for all images as the set of emphasis values.

The print attribute controller 180 receives the set of emphasis values and appeal values, analyzes theses values, and produces a print attribute value for each digital image in the group of digital images. These print attribute values are received by the image output devices 130 and are used to vary or control one or more print attributes such as, but not limited to, the number of prints, the size of the prints, or the magnification of the prints.

The present invention may be practiced with analog printing systems. For this application, the print attribute values are used to control the printing exposure sub-system to vary or control one or more print attributes such as, but not limited to, the number of prints, the size of the prints, or the magnification of the prints.

Networked Computer System

The present invention may be implemented with multiple computers connected via a computer network such as, but not limited to, the internet as accessed via the World Wide Web. As part of the digital image processing procedures involved in the practice of the present invention, two central processing functionalities are embodied: 1) the calculation of an assessment (emphasis or appeal) value derived from the pixel values contained in each digital image and 2) the calculation of a print attribute value. One or both of these central elements may be achieved in a single computer; however, it is possible for the calculation of the assessment values and the calculation of the print attribute values to be performed on different computers while a third computer system performs the output functions, e.g., printing.

Figure 13:
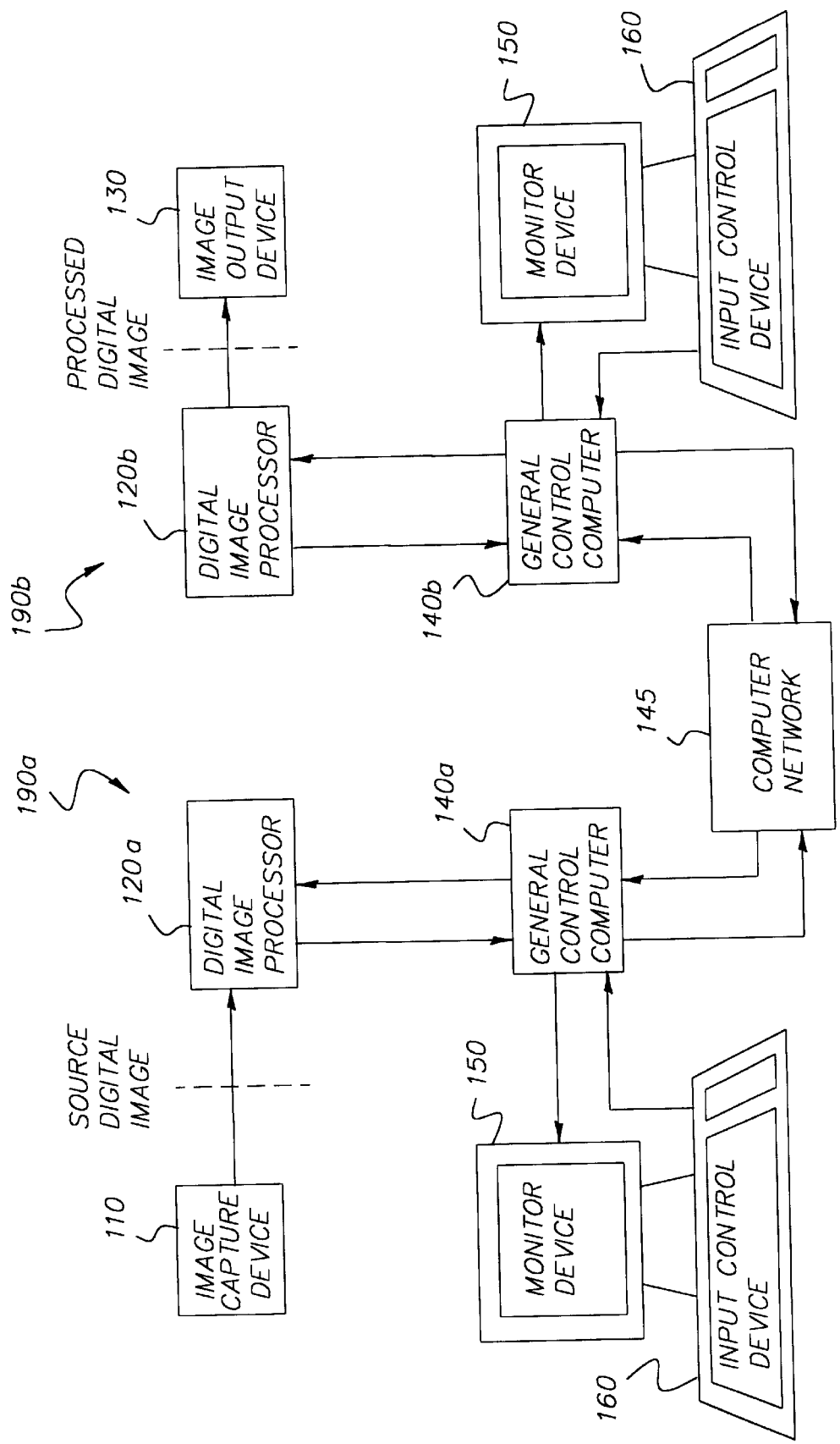
FIG. 13 is a block diagram showing a computer internet image processing system suitable for practicing the invention.

The diagram illustrated in FIG. 13 shows two computer systems as depicted in FIG. 11 connected together via a computer network 145. Referring to FIG. 13, one of the computer systems 190a is shown with an image capture device 110 connected to its digital image processor 120a while the other computer system 190b is shown with an image output device 130 connected to its digital image processor 120b. The image capture device 110 produces a digital image which is received and processed by the connected digital image processor 120a. A set of assessment values is calculated in the digital image processor 120a. The source digital image and the assessment values are transmitted to the second computer system 190b over the computer network 145. The digital image processor 120b of the second computer system 190b receives the source digital image and uses the assessment values to calculate the print attribute values for each image and transform the digital images in a manner such that a suitably looking image is produced by the image output device 130.

Although two computer systems 190a and 190b are shown in FIG. 13, the present invention may be practiced with more than two computer systems. It is possible to practice the present invention with a first computer system capturing the source digital image, the source digital image then being received by a second computer system which calculates the assessment values, a third computer system then receiving the assessment values and the source digital image and calculating the print attribute values, and a fourth computer system which receives the print attribute values and produces a visual display of the processed digital images and/or copies of the digital images in accordance with the print attribute values.

The assessment values and print attribute values are examples of image meta-data, i.e., a piece of non-pixel information related to a digital image. Image meta-data may be used for such purposes as, but not limited to, conveying information about how the digital image was captured, adding context to the meaning of the digital image such as the photographer's annotation, or adding analysis information about the digital image. In one embodiment of the present invention, these assessment values are transmitted as image meta-data over a computer network to enable a different computer system to use the image meta-data to control the printing of the digital images.

FIG. 13 can thus be understood to describe a web-based processing architecture enabling on-line image processing, ordering and printing utilizing a variety of image processing algorithms and modules, including those described herein. In this connection, it is helpful to view FIG. 13 in terms of a typical client—server setting for a web-based architecture, which includes a server host 190b interconnected via a network 145 (e.g., the Internet) with a client host 190a. Following-an appropriate establishment of communication between the client host and the sewer host, a web server is run on the server computer 140b and a web browser is run on the client computer 140a, causing display on the monitor device 150 of an "request" web page generated by, e.g., an applet. The client application functionality is incorporated into the applet, including, e.g., at least the image emphasis network 10. In addition, the client application may include the print attribute controller 180 shown in FIG. 12 (or this functionality can be provided by the web server or a utility connected to the web server). The client application is thus loaded and run in the web browser and displayed via the applet and the web browser onto the display 150.

In operation, a user at the client host 190a inputs a particular image, or a group of images, via the capture device 110 (or from an image store, see below) and selects a particular image printing option via the "request" web page, which causes the applet to generate the assessment and/or attribute values and to instruct the web browser to execute a request to the web server to upload the image and initiate image printing. Alternatively the image may be uploaded from a storage device (not shown) accessible to the user, or may have been provided from a variety of other sources accessible to the server host 190b. The server initiates communications with the digital image processor 120b, which contains the image processing chain. The image output functionality, such as the image output device 130, is also included with the server host 190b, or is accessible as a separate utility service from the server host. The digital image processor 120b performs the appropriate functions in the image processing chain and returns the appropriate response, for instance, the modified images, to the web server, which in turn causes the web server to return the response to the applet. The applet generates a further web page to be displayed in the web browser running on the general control computer 140a. While the web-based architecture described above generates web pages via applets, it should be understood that other means of web page generation, such as via CGI script, can also be utilized in accordance with the invention.

Print Attribute Value Calculation

The image assessment network 10 generates the assessment values, i.e., the emphasis values and/or the appeal values. Let a group of digital images numbered one through n have a corresponding set of emphasis values E, received from the image emphasis network 10, with elements numbered one through n described by $$E=\{e_1,e_2,\ldots,e_n\}$$

where the $e_j$ term refers to the individual emphasis value for the $j^{th}$ digital image. In addition, or alternatively, a set of appeal values A, also corresponding to the n digital images, is received from the image emphasis network 10, with elements numbered one through n described by $$A=\{a_1,a,\ldots,a_n\}$$

where the $a_j$ term refers to the individual appeal value for the $j^{th}$ digital image. The set of emphasis values E represent the relative importance of a digital image within the group of digital images. The set of appeal values A relates to the absolute aesthetic quality of each digital image. The print attribute controller 180 performs a rank ordering processing which sorts the individual assessment values in number order. The process results in a set of rank indices R described by $$R=\{r_1,r_2,\ldots,r_n\}$$

where the $r_j$ term refers to the relative importance of the $j_{th}$ digital image within the group of digital images. For example, R may contain the values $$R=\{5,2,\ldots,3\}$$

Where the first digital image in the group of digital images is the fifth most important digital image, the second digital image is the second most important digital image, and the $n^{th}$ digital image is the third most important digital image within the group of digital images.

The set of rank indices R, the set of emphasis values E, or the appeal values A is used to determine a set of print attribute values P given by $$P=\{p_1,p_2,\ldots,p_n\}$$

where the $p_j$ term refers to the print attribute value of the $j^{th}$ digital image of the group of digital images. The individual print attribute values produced by the print attribute controller 180 are received by the image output devices 130 shown in FIG. 11. The print attribute values are used by the image output devices to vary an attribute of the prints made, such as the number of prints made of the image, the size of a print made from the image, or the magnification factor used for the image.

The present invention may be used to vary the number of prints made from an individual digital image. Typically, in a commercial printing service system, the number of prints per image is fixed at one or two. The preferred embodiment of the present invention changes the number of prints per image made based on the corresponding print attribute value for the individual digital image. For example, the set of rank indices R is subdivided into four subsets or quartiles. The digital images with corresponding assessment values ranking in the top quartile receive a print attribute value of 3, the middle two quartiles receive a value of 2, and the bottom quartile receives a value of 1. Then, for example, for each digital image with a corresponding print attribute value of 3, the image output device 130 will be commanded to make three prints. Correspondingly, for each digital image with a print attribute value of 2, the image output device 130 will be commanded to make two prints and for each digital image with a print attribute value of 1, the image output device 130 will be commanded to make one print. Thus the print attribute values control the number of prints per individual images directly. For the preferred embodiment of the present invention, which controls the number of prints per digital image, the total number of prints for the group of digital images is constant.

An alternative embodiment of the present invention varies the number of prints per digital image in a manner which results in a variable number of total prints for the group of digital images. In this method, the print attribute values are determined by comparing the assessment values to a predetermined threshold value. For example, experiments with consumer images have shown that images with corresponding appeal values of 0.7 or greater are considered to be of significant enjoyment to the consumer as compared with images which have corresponding appeal values of less than 0.7. Thus for all the digital images in the group of digital images which have a corresponding emphasis value of greater than or equal to 0.7 a print attribute value of 2 is assigned. For all the digital images in the group of digital images which have a corresponding emphasis value of less than 0.7 a print attribute value of 1 is assigned. Therefore, with this alternative embodiment the total number of prints made for the group of digital images will vary from group to group based on the emphasis values computed for the individual digital images, e.g., for those prints receiving a print attribute value of 2, the image output device 130 will make more prints per image than for prints receiving a print attribute value of 1. For some groups of digital images only N prints will be made whereas for other as many as 2 N will be made.

The present invention may be used to vary the size of prints made from an individual digital image. Typically, in a commercial printing service system, the size of prints made is fixed. For example, a customer order for prints may specify 3 inch by 5 inch size prints. Other popular sizes include, but are not limited to, 4 inch by 6 inch, and 5 inch by 7 inch. The preferred embodiment of the present invention changes the size of prints made for an individual image based on the print attribute value for the individual digital image. The digital images with the highest corresponding assessment values will be printed with a larger size. For example, the digital image with a corresponding rank index of one will be printed in the 5 inch by 7 inch size paper. All other digital images will be printed with the smaller size of 4 inch by 6 inch paper. In this embodiment of the present invention the total number of prints made from the group of digital images is fixed.

An alternative embodiment of the present invention varies the number of prints per digital image in a manner which results in a fixed number of total prints. In this method, the print attribute values are determined by comparing the assessment values to a predetermined threshold value. For all the digital images in the group of digital images which have a corresponding assessment value of greater than or equal to 0.7 a print attribute value of 2 is assigned. For all the digital images in the group of digital images which have a corresponding assessment value of less than 0.7 a print attribute value of 1 is assigned. Digital images with a corresponding print attribute value of 2 will be printed in the 4 inch by 6 inch size paper while digital images with a corresponding print attribute value of 1 will be printed in the 3 inch by 5 inch size paper. It should be obvious to those skilled in the art that combinations of the preferred embodiments and alternative embodiments may easily be made and fall within the scope of the present invention.

The present invention may be used to vary the magnification factor of prints made from an individual image. Typically, in a commercial printing service system, the magnification factor of prints made is fixed at 1.0. With a magnification factor of 1.0 all or nearly all of the image content of the original photograph is imaged onto the photographic paper. If the image is printed with a magnification factor greater than 1.0, only a portion of the original image content will be represented on the print paper. For example, with a magnification factor of 2.0, the center one fourth of image area will be printed. This is true regardless of the paper size used to make the print. For a digital imaging printer, the equivalent process involves interpolating a subset region of the original digital image. For example, with a magnification factor of 2.0, the center one fourth of image area will be interpolated to form a new digital image which is received by an output image device.

Since a subset of the original digital images is interpolated, a choice must be made as to which subset of image area to use. The preferred embodiment of the present invention uses the technique of simply selecting the center portion of the digital image. The exact amount of image area selected is based on the aspect ratio of the intended paper size and the magnification factor. Alternatively, an image area can be selected that is centered around the main subject. A detailed description of a method for locating a main subject area suitable for cropping and zooming can be found in commonly-assigned copending U.S. Ser. No. 09/490,915, entitled "Method for Automatically Creating Cropped and Zoomed Versions of Photographic Images," filed Jan. 25, 2000 in the names of Jiebo Luo and Robert Gray, which is incorporated herein by reference.

The preferred embodiment of the present invention changes the magnification factor of prints made for an individual image based on the corresponding print attribute value for the individual digital image. The digital images with the highest corresponding assessment values will be printed with a larger magnification factors. Experimentation with consumer photographs has revealed that many consumer photographs are considered less important due to the relatively low camera lens zoom magnification used at the time of capture. The digital images contained in the group of digital images with corresponding assessment values in the top quartile will be assigned a print attribute value of 1, the second quartile will be assigned 2, the third quartile 3 and the fourth quartile 4. The corresponding magnification factors associated with the print attribute values of 1, 2, 3, and 4 are 1.3, 1.2, 1.1, and 1.0, respectively. Alternatively, where a higher magnification is applied to photographs considered less important, then these numbers are reversed.

An alternative embodiment of the present invention chooses the digital image with the highest relative assessment value rank and prints an additional print of that digital image with a magnification factor of 2.0. Thus a 4 inch by 6 inch print of all the digital images in the group of digital images will be made at a magnification factor of 1.0 and one additional print of the best digital image will be made with a magnification factor of 2.0.

Assessment Value Calculation

As described herein, it is important to rank the images in terms of their relative value and/or their intrinsic value, so that they can be processed or treated according to these values. This logical ranking is based upon two related assessments of the images: image appeal and image emphasis. Image appeal is the intrinsic degree of importance, interest or attractiveness of an individual picture; image emphasis, on the other hand, is the relative importance, interest or attractiveness of the picture with respect to other pictures in the group. The assessment algorithm would be expected to operate on the images and assign assessment values (i.e., emphasis and/or appeal values) to each image. The assessment values may be viewed as metadata that are associated with every image in a particular group and may be exploited by other algorithms, such as the aforementioned image processing chain.

Figure 1:
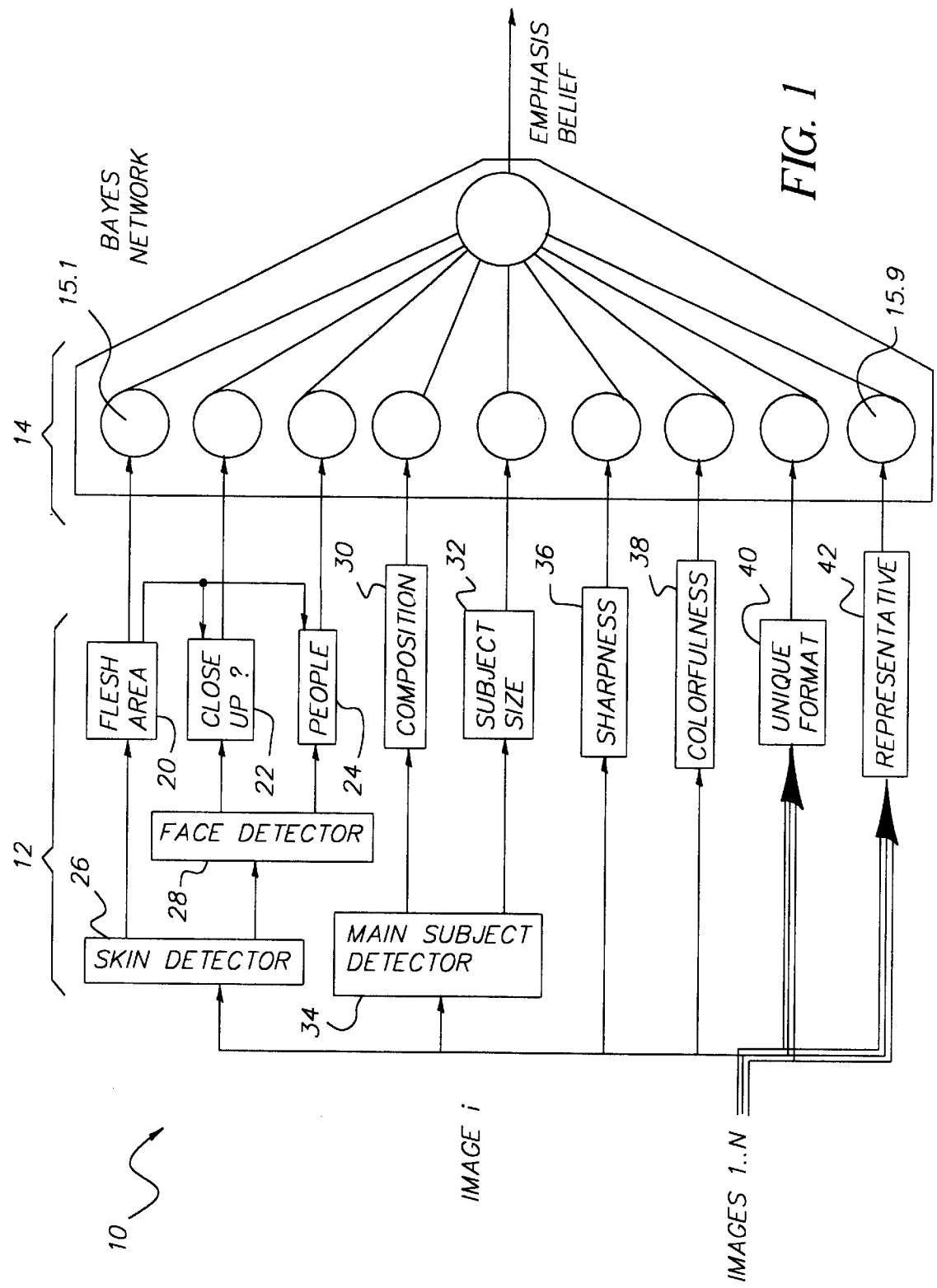
FIG. 1 is a block diagram of a network for calculating an emphasis value for an image.
Figure 2:
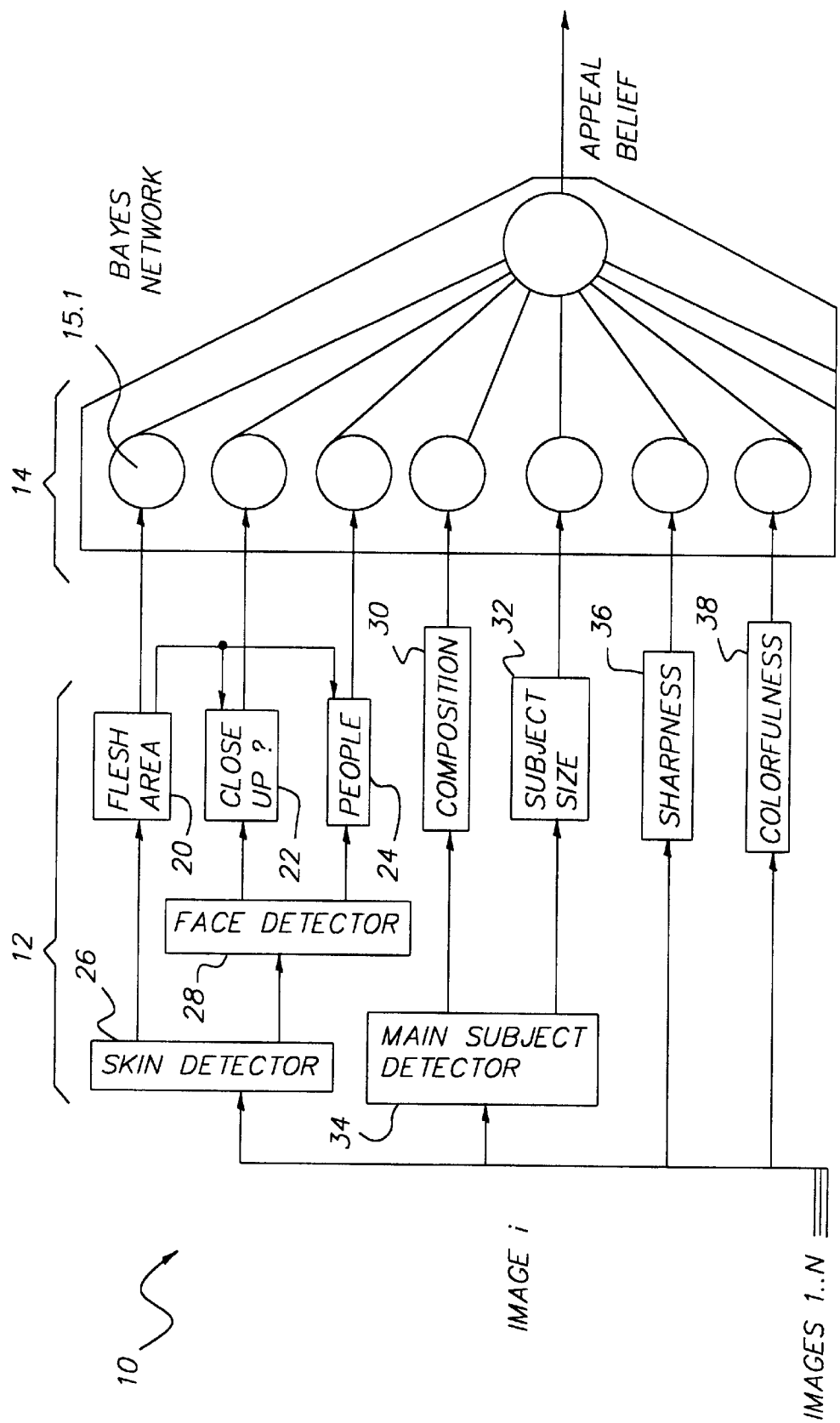
FIG. 2 is a block diagram of a network for calculating an appeal value for an image.
Figure 3:
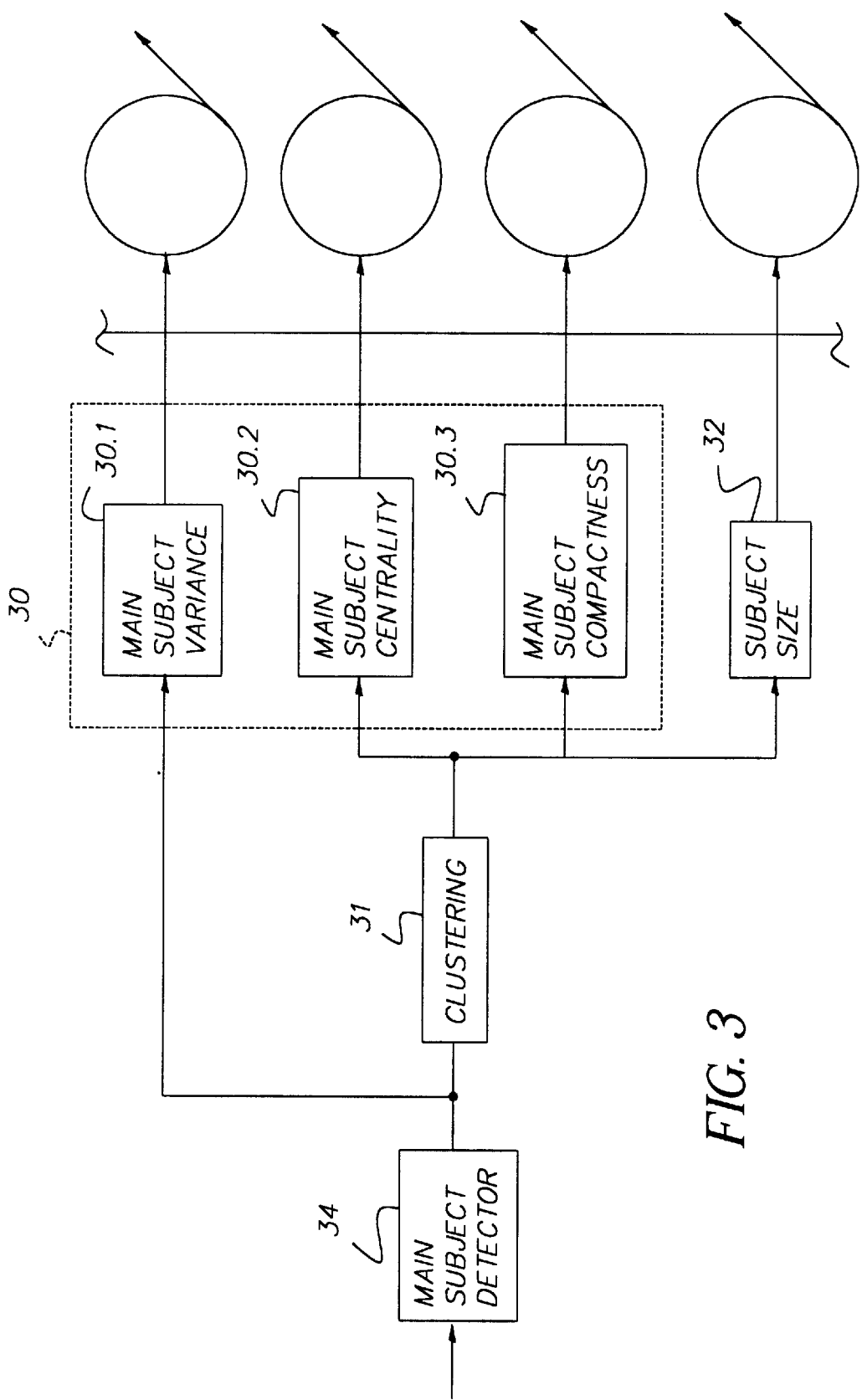
FIG. 3 is a block diagram showing in more detail the components of main subject detection as shown in FIGS. 1 and 2.
Figure 4:
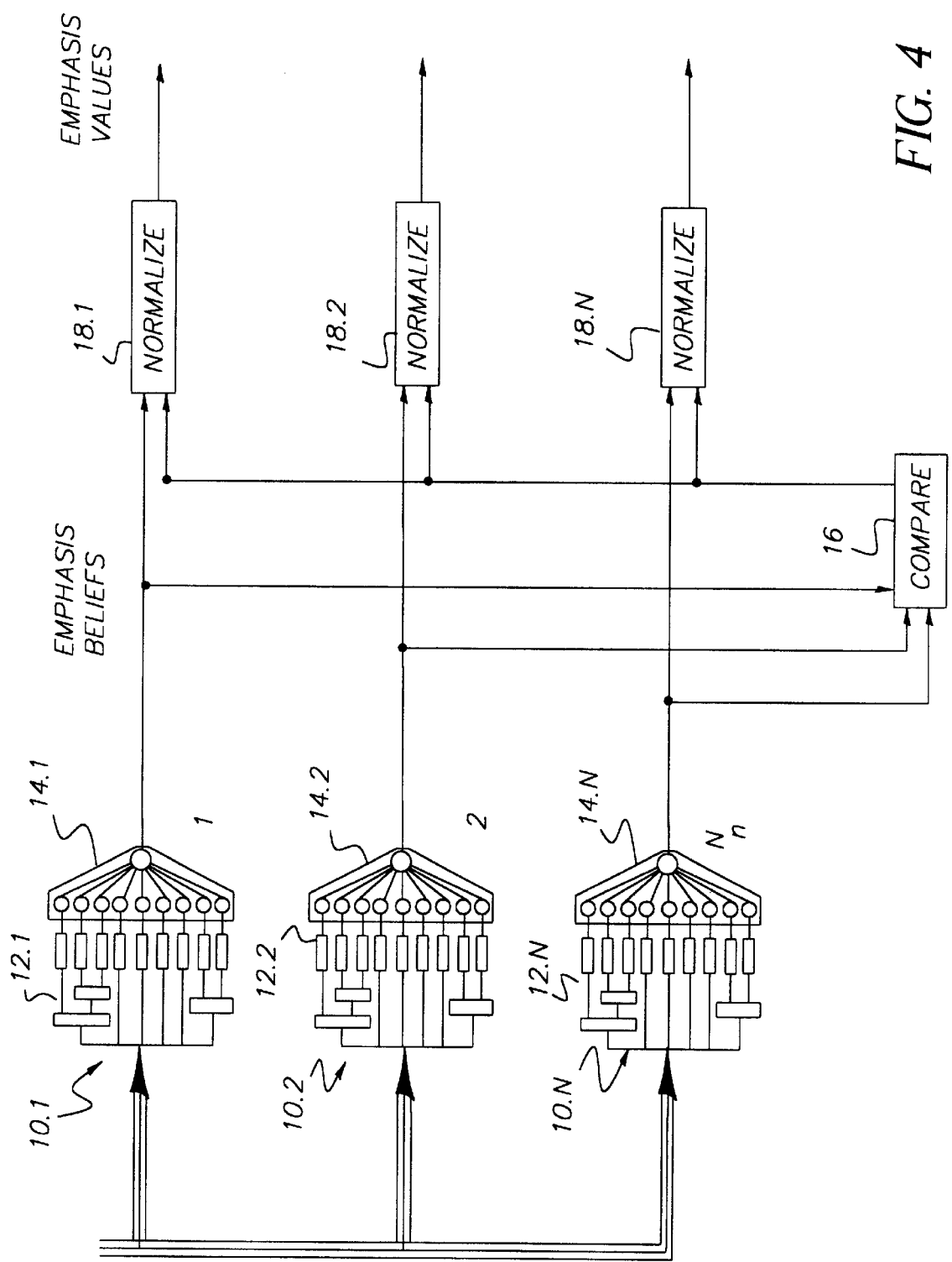
FIG. 4 is a block diagram of a network architecture for calculating the relative emphasis values of a group of images.

The image assessment network 10 shown in FIG. 12 is described in more detail in FIGS. 1 through 10, which are adapted from co-pending, commonly-assigned U.S. Ser. No. 09/460,759, filed Dec. 14, 1999 in the names of Andreas E. Savakis and Stephen Etz and entitled "Method for Automatic Assessment of Emphasis and Appeal in Consumer Images", and which is incorporated herein by reference. Referring first to FIG. 1, an image assessment network 10 for computing an emphasis value is shown to comprise two stages: a feature extraction stage 12 and a classification stage 14. The feature extraction stage 12 employs a number of algorithms, each designed to measure some image feature characteristic, where a quantitative measure of the feature is expressed by the value of the output of the algorithm. The outputs of the feature extraction stage 12 thus represent statistical evidence of the presence (or absence) of certain features; the outputs are then integrated by the classification stage 14 to compute an emphasis value. This value may, e.g., range from 0 to 100 and indicates the likelihood or belief that the processed image is the emphasis image. After the emphasis values have been computed for a group of images in separate image emphasis networks 10.1, 10.2 ... 10.N, as shown in FIG. 4, the emphasis values are compared in a comparator stage 16 and normalized in respective normalization stages 18.1, 18.2 ... 18.N. The image with the highest emphasis value is chosen as the emphasis image for the group.

An ensemble of features was selected for the feature extraction stage 12 on the basis of ground truth studies of the preference of human observers. The ground truth studies showed that the features that are important for emphasis image selection are not strongly related to traditional image quality metrics, such as sharpness, contrast, film grain and exposure, although one or more of these traditional metrics may continue to have value in the calculation of an assessment value. The selected features may be generally divided into three categories: (a) features related to people, (b) features related to the main subject, and (c) features related to objective measures of the image. Referring to FIG. 1, features related to people are extracted by a skin area detector 20, a close-up detector 22 and a people detector 24. The input image i is typically processed through a skin detector 26 and a face detector 28 to generate intermediate values suitable for processing by the people-related feature detectors 20, 22 and 24. The features related to the main subject are extracted by a composition detector 30 and a subject size detector 32, based on input from a main subject detector 34. The composition detector 30 is composed of several composition-related main subject algorithms, as shown in FIG. 3, including a main subject variance algorithm 30.1, a main subject centrality algorithm 30.2 and a main subject compactness algorithm 30.3. The main subject data is clustered in a clustering stage 31 and then provided to the composition-related algorithms 30.2 and 30.3 and to the subject size algorithm 32. The features related to objective measures of the image are extracted by a sharpness detector 36, a colorfulness detector 38 and a unique format detector 40. In addition, an objective measure related to how representative the color content of an image is relative to a group of images is extracted by a representative color detector 42.

The feature ensemble shown in FIG. 1 is used to calculate a value representative of image emphasis, which is defined as the degree of relative importance, interest or attractiveness of an image with respect to other images in a group. Since each image must be evaluated in relation to other images in a group, the image emphasis calculation thus embodies a network of image emphasis networks 10.1, 10.2 ... 10.N, such as shown in FIG. 4, which scores the images as to their respective emphasis values. In practice, there may be but one image emphasis network 10, which is repeatedly engaged to determine the image emphasis value of a series of images; in this case, the sequentially obtained results could be stored in an intermediate storage (not shown) for input to the comparator 16. The feature ensemble shown in FIG. 2, which is a subset of the feature ensemble shown in FIG. 1, is used to calculate a value representative of image appeal, which is defined as the intrinsic degree of importance, interest or attractiveness of an image in an absolute sense, that is, without reference to other images. The features shown in FIG. 2 are thus referred to as self-salient features, inasmuch as these features can stand on their own as an assessment of an image. In comparison, two additional features are detected in FIG. 1, namely, the unique format feature and the representative color feature; these are referred to as relative-salient features, inasmuch as these features are measurements that necessarily relate to other images. (These features, however, are optional insofar as a satisfactory measure of emphasis can be obtained from the self-salient features alone.) Consequently, an assessment of both appeal and emphasis involve self-salient features, while only an assessment of emphasis may involve relative-salient features.

The extraction of the feature ensembles according to FIGS. 1 and 2 involves the computation of corresponding feature quantities, as set forth below.

Objective Features

Objective features are the easiest to compute and provide the most consistent results in comparison to other types of features. Methods for computing them have been available for some time, and a large art of imaging science is based on such measures. Although a large number of objective features could potentially be computed, only colorfulness and sharpness are considered for purposes of both image emphasis and appeal (FIGS. 1 and 2), and additionally unique format and representative color for purposes of image emphasis (FIG. 1). Other objective measures, such as contrast and noise, may be found useful in certain situations and are intended to be included within the coverage of this invention.

Colorfulness

Figure 6:
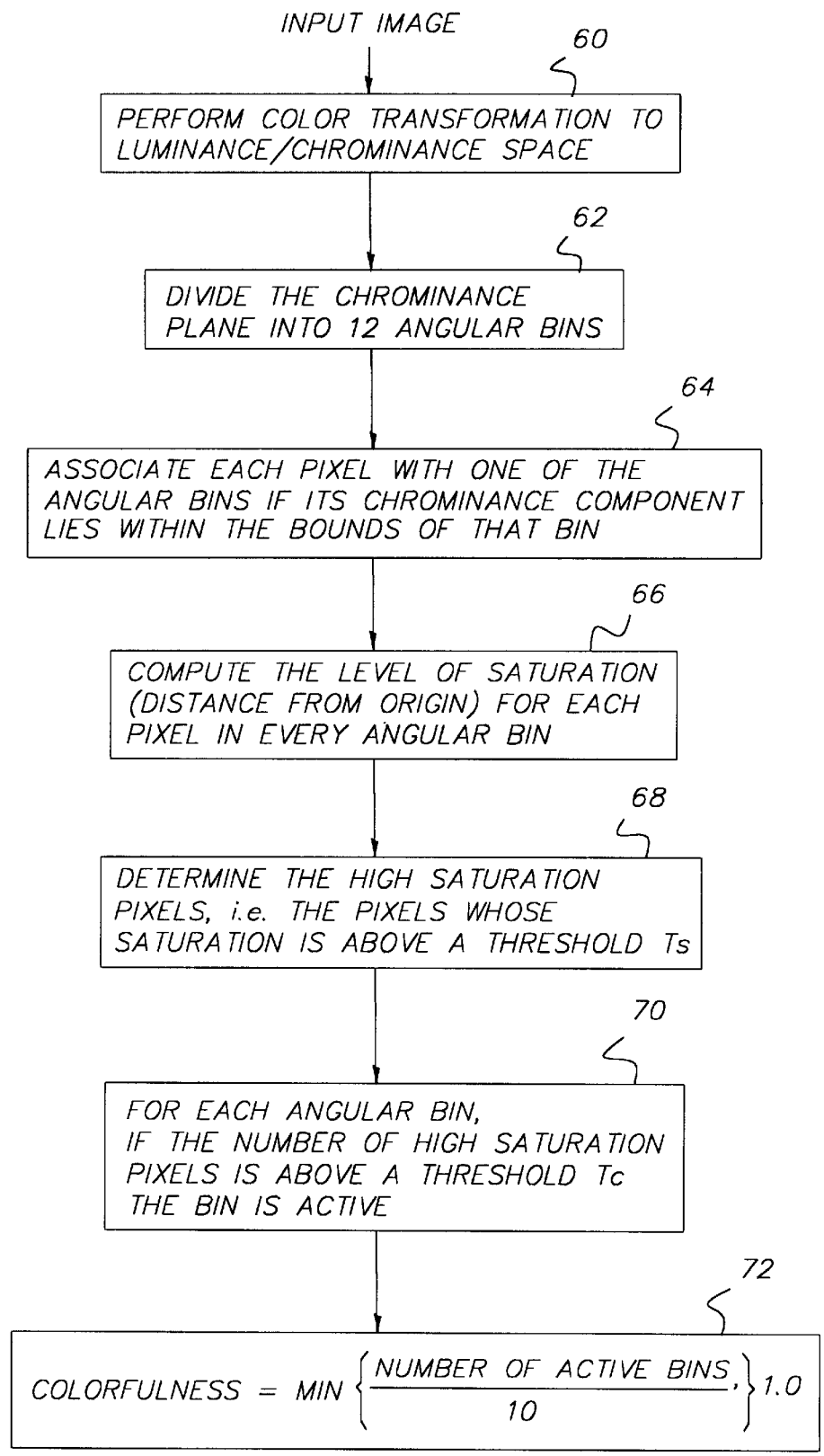
FIG. 6 is a detailed diagram of a method for determining the colorfulness of an image.
Figure 7:
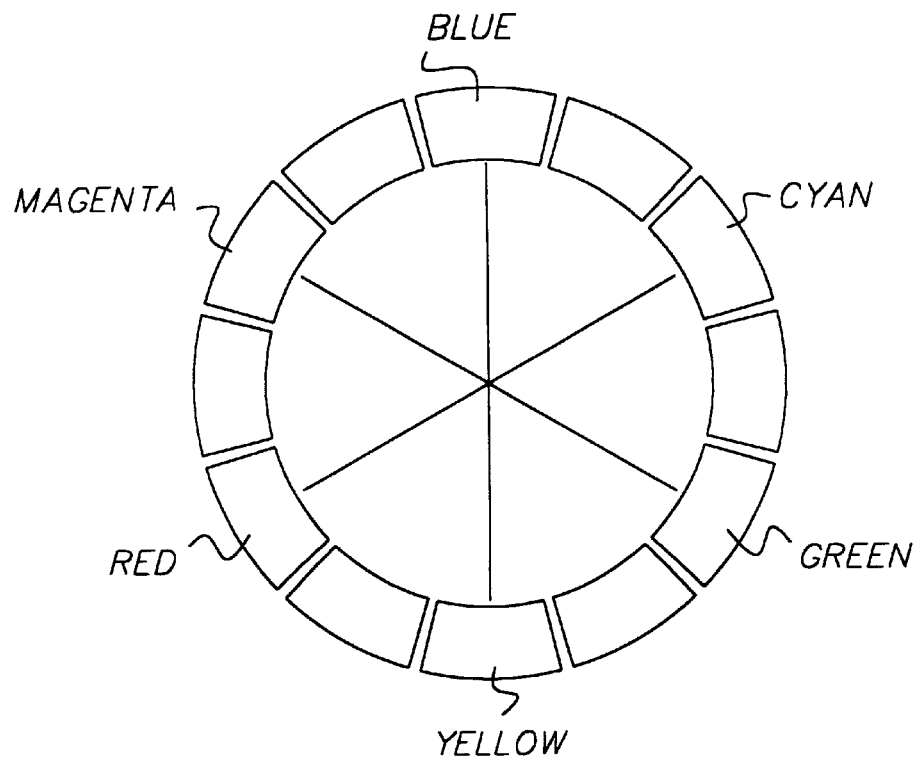
FIG. 7 is a diagram of chromaticity plane wedges that are used for the colorfulness feature computation.

The colorfulness detector 38 provides a quantitative measure of colorfulness based on the observation that colorful pictures have colors that display high saturation at various hues. This was determined in ground truth studies by examining for the presence of high saturation colors along various hues. The assumption of sRGB color space was made with respect to the image data. In particular, and as shown in FIG. 6, the colorfulness detector 38 implements the following steps for computing colorfulness. Initially, in step 60, the input image values i are transformed to a luminance/chrominance space. While many such transformations are known to the skilled person and may be used with success in connection with the invention, the preferred transformation is performed according to the following expressions:

$$\text{Neutral} = \left(\frac{R+G+B}{3}\right)$$

$$\text{Green-Magenta} = \left(\frac{2G-R-B}{4}\right)$$

$$\text{Illumination} = \left(\frac{B-R}{2}\right)$$

where neutral is a measure of luminance, and green-magenta and illumination are a measure of chrominance. In step 62, the chrominance plane (illumination, green-magenta) is divided and quantized into twelve chromaticity plane wedges, as shown in FIG. 7, which are referred to as angular bins. Next, in step 64, each pixel is associated with one of the angular bins if its chrominance component lies within the bounds of that bin. The level of saturation (which is the distance from origin) is calculated in step 66 for each pixel in each angular bin. The number of high saturation pixels that populate each angular bin are then measured in step 68, where a high saturation pixel is one whose distance from the origin in the chrominance plane is above a certain threshold $T_s$ (e.g., $T_s=0.33$). For each angular bin, the bin is determined to be active in step 70 if the number of high saturation pixels exceeds a certain threshold $T_c$ (e.g., $T_c=250$ pixels). Colorfulness is then calculated in step 72 according to the following expression:

$$\text{Colorfulness} = \min\left\{\frac{\text{Number of active bins}}{10}, 1.0\right\}$$

Note that this definition of colorfulness assumes that if 10 out of the 12 bins are populated, colorfulness is considered to be 1.0 and the image is most colorful.

Sharpness

The sharpness detector 36 implements the following steps to find sharpness features in the image:
a) The image is cropped at a 20% level along the border and converted to grayscale by extracting the green channel;
b) The image edges are detected in the green channel using a Sobel operator after running a 3×3 averaging filter to reduce noise;
c) An edge histogram is formed and the regions that contain the strongest edges are identified as those that are above the 90$^{th}$ percentile of the edge histogram;
d) The strongest-edge regions are refined through median filtering, and the statistics of the strongest edges are computed; and
e) The average of the strongest edges provides an estimate of sharpness.

Further details of the method employed for sharpness detection may be found in commonly assigned U.S. Pat. No. 6,535,636 entitled "A Method for Automatically Detecting Digital Images that are Undesirable for Placing in Albums", issued Mar. 18, 2003 in the names of Andreas Savakis and Alexander Loui, and which is incorporated herein by reference.

Format Uniqueness

Participants in the ground truth experiment indicated that pictures taken in APS "panoramic" mode are more deserving of emphasis. Preliminary analysis of the ground truth data indicated that if a picture was the only panoramic picture in a group, this fact increases its likelihood of being selected as the emphasis image. The relative feature "format uniqueness" represents this property.

The unique format detector 40 implements the following algorithm for each image i in the group, in which the format f is based on the long and short pixel dimensions $l_i$, $s_i$, of the image:

$$f_i \equiv \begin{cases} C, & l_i/s_i < 1.625, \\ H, & 1.625 \leq l_i/s_i < 2.25, \\ P, & 2.25 \leq l_i/s_i. \end{cases}$$

Then format uniqueness U is $$U_i = \begin{cases} 1, & f_i \neq f_j, \forall \ \neq j, \\ 0, & \text{otherwise.} \end{cases}$$

Representative Color

The representative color detector 42 implements the following steps to determine how representative the color of an image is:

1. For each image i, compute the color histogram $h_i(R, G, B)$ (in RGB or Luminance/Chrominance space)
2. Find the average color histogram for the group by averaging all of the image histograms as follows:

$$A_h(R, G, B) = \sum_{i=1}^{N} h_i(R, G, B)$$

3. For each image i, compute the distance between the histogram of the image and the average color histogram (Euclidian or Histogram intersection distance), as follows:

$$d_i(R, G, B) = \frac{1}{2}\sum_{i=1}^{N} |h_i(R, G, B) - A_h(R, G, B)|$$

4. Find the maximum of the distances computed in 3, as follows:

$$d_{\max}(R, G, B) = \max_{i=1 \ldots N} \{d_i(R, G, B)\}$$

5. The representative measure r is obtained by dividing each of the distances with the maximum distance (can vary from 0 to 1), as follows:

$$r_i(R, G, B) = \frac{d_i(R, G, B)}{d_{\max}(R, G, B)}$$

People-Related Features

People related features are important in determining image emphasis, but many of the positive attributes that are related to people are difficult to compute, e.g. people smiling, people facing camera, etc. Skin detection methods allow the computation of some people-related features such as: whether people are present, the magnitude of the skin area, and the amount of closeup.

Skin and Face Detection

The skin detection method that is used by the skin detector 26, and the face detection method that is used by the face detector 28, is based on the method disclosed in commonly assigned patent application Ser. No. 09/112,661 entitled "A Method for Detecting Human Faces in Digitized Images" which was filed Jul. 9, 1998 in the names of H. C. Lee and H. Nicponski (and now abandoned), and which is incorporated herein by reference.

Figure 8:
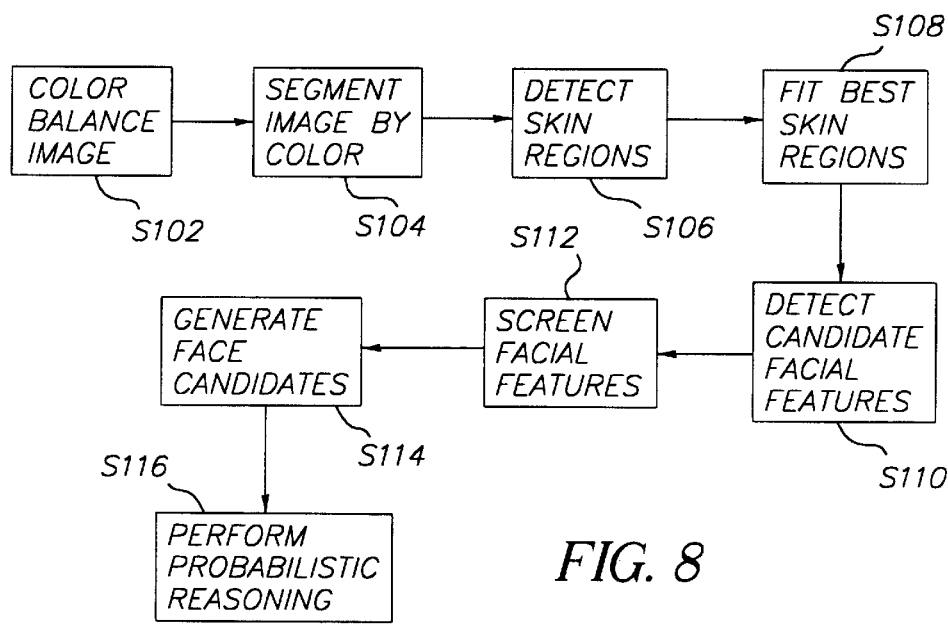
FIG. 8 is a block diagram of a method for skin and face detection.

Referring to FIG. 8, an overview is shown of the method disclosed in Ser. No. 09/112,661. The input images are color balanced to compensate for predominant global illumination in step S102, which involves conversion from (r,g,b) values to (L,s,t) values. In the (L,s,t) space, the L axis represents the brightness of a color, while the s and t axes are chromatic axes. The s component approximately represents the illuminant variations from daylight to tungsten light, from blue to red. The t component represents an axis between green and magenta. A number of well-known color balancing algorithms may be used for this step, including a simple method of averaging-to-gray. Next, a k-mode clustering algorithm is used for color segmentation in step S104. A disclosure of this algorithm is contained in commonly assigned U.S. Pat. No. 5,418,895, which is incorporated herein by reference. Basically, a 3-D color histogram in (L,s,t) space is formed from the input color image and processed by the clustering algorithm. The result of this step is a region map with each connected region having a unique label. For each region, the averaged luminance and chromaticity are computed in step S106. These features are used to predict possible skin regions (candidate skin regions) based on conditional probability and adaptive thresholding. Estimates of the scale and in-plane rotational pose of each skin region are then made by fitting a best ellipse to each skin region in step S108. Using a range of scales and in-plane rotational pose around these estimates, a series of linear filtering steps are applied to each facial region in step S110 for identifying tentative facial features. A number of probability metrics are used in step S112 to predict the likelihood that the region actually represents a facial feature and the type of feature it represents.

Features that pass the previous screening step are used as initial features in a step S114 for a proposed face. Using projective geometry, the identification of the three initial features defines the possible range of poses of the head. Each possible potential face pose, in conjunction with a generic three-dimensional head model and ranges of variation of the position of the facial features, can be used to predict the location of the remaining facial features. The list of candidate facial features can then be searched to see if the predicted features were located. The proximity of a candidate feature to its predicted location and orientation affects the probabilistic estimate of the validity of that feature.

A Bayesian network probabilistic model of the head is used in a step S116 to interpret the accumulated evidence of the presence of a face. The prior probabilities of the network are extracted from a large set of training images with heads in various orientations and scales. The network is initiated with the proposed features of the candidate face, with their estimated probabilities based on computed metrics and spatial conformity to the template. The network is then executed with these initial conditions until it converges to a global estimate of the probability of face presence. This probability can be compared against a hard threshold or left in probabilistic form when a binary assessment is not needed. Further details of this skin and face detection method may be found in Ser. No. 09/112,661, which is incorporated herein by reference.

Skin Area

The percentage of skin/face area in a picture is computed by the skin area detector 20 on its own merit, and also as a preliminary step to people detection and close-up detection. Consequently, the output of the skin area detector 20 is connected to the classification stage 14 and also input to the close-up detector 22 and the people detector 24. Skin area is a continuous variable between 0 and 1 and correlates to a number of features related to people. For example, for pictures taken from the same distance, increasing skin area indicates that there are more people in the picture and correlates with the positive indicator of "whole group in photo." Alternatively, if two pictures contain the same number of people, larger skin area may indicate larger magnification, which correlates with the positive attribute of "closeup." Other explanations for larger skin area are also possible due to subject positioning.

Close-up

The close-up detector 22 employs the following measure for determining close-up:

a) skin detection is performed and the resulting map is examined at the central region (25% from border); and b) close-up is determined as the percentage of skin area at the central portion of the image.

In some cases, face detection would be more appropriate than skin detection for determining close-up.

People Present

The presence of people is detected by the people detector 24 when a significant amount of skin area is present in the image. The percentage of skin pixels in the image is computed and people are assumed present when the skin percentage is above a threshold $T_f$ number of pixels (e.g., $T_f$=20 pixels). People present is a binary feature indicating the presence or absence of people for 1 or 0 respectively.

Composition Features

Good composition is a very important positive attribute of picture emphasis and bad composition is the most commonly mentioned negative attribute. Automatic evaluation of the composition of an image is very difficult and sometimes subjective. Good composition may follow a number of general well-known rules, such as the rule of thirds, but these rules are often violated to express the photographer's perspective.

Main Subject Detection

Figure 9:
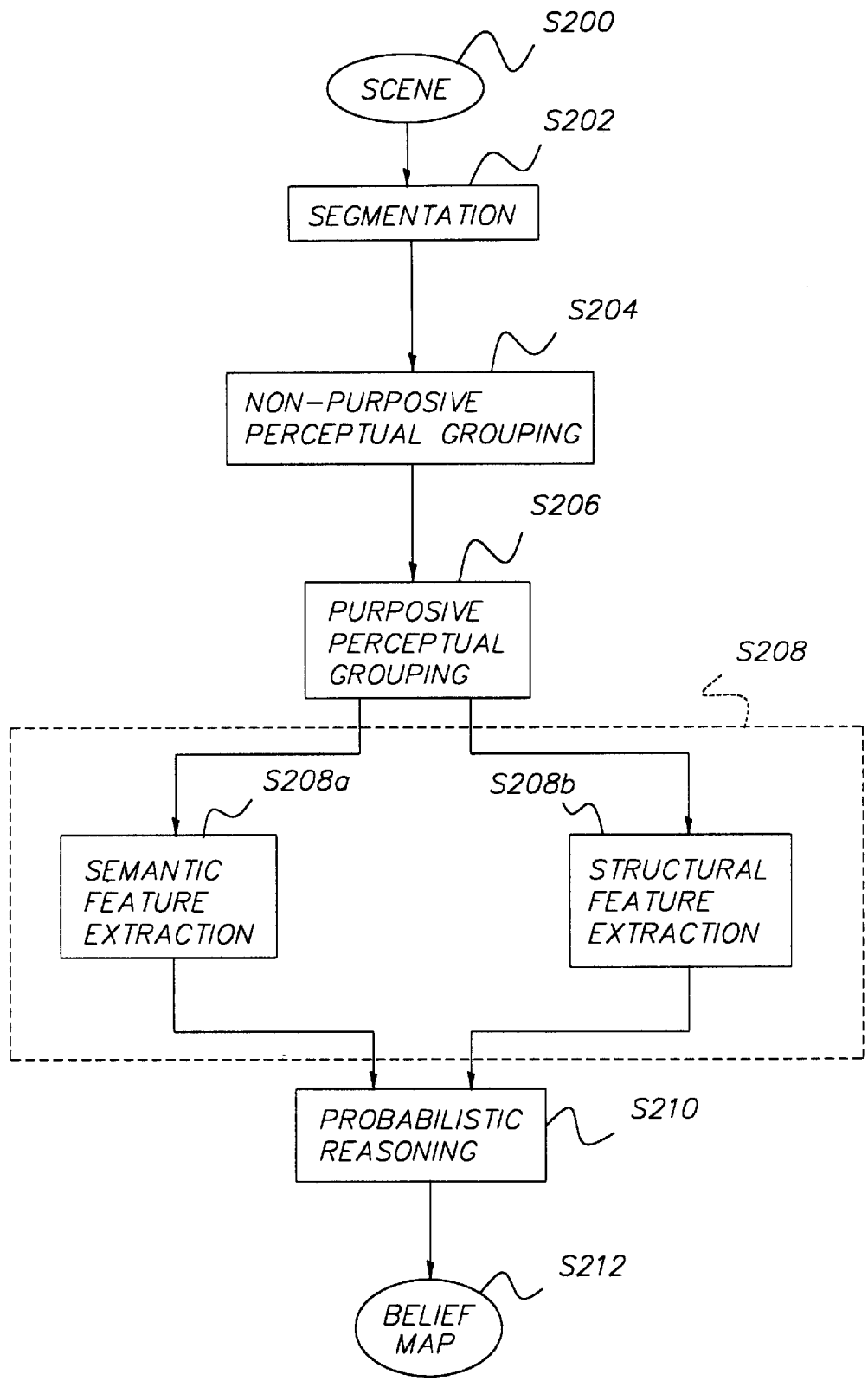
FIG. 9 is a detailed block diagram of main subject detection as shown in FIG. 5.

The algorithm used by the main subject detector 34 is disclosed in commonly assigned U.S. Pat. No. 6,282,317 entitled "Method for Automatic Determination of Main Subjects in Consumer Images", issued 28 Aug. 2001 in the names of J. Luo, S. Etz and A. Singhal. Referring to FIG. 9, there is shown a block diagram of an overview of the main subject detection method disclosed in U.S. Pat. No. 6,282, 317. First, an input image of a natural scene is acquired and stored in step S200 in a digital form. Then, the image is segmented in step S202 into a few regions of homogeneous properties. Next, the region segments are grouped into larger regions in step S204 based on similarity measures through non-purposive perceptual grouping, and further grouped in step S206 into larger regions corresponding to perceptually coherent objects through purposive grouping (purposive grouping concerns specific objects). The regions are evaluated in step S208 for their saliency using two independent yet complementary types of saliency features—structural saliency features and semantic saliency features. The structural saliency features, including a set of low-level early vision features and a set of geometric features, are extracted in step S208a, which are further processed to generate a set of self-saliency features and a set of relative saliency features. Semantic saliency features in the forms of key subject matters, which are likely to be part of either foreground (for example, people) or background (for example, sky, grass), are detected in step S208b to provide semantic cues as well as scene context cues. The evidences of both types are integrated in step S210 using a reasoning engine based on a Bayes net to yield the final belief map step S212 of the main subject.

To the end of semantic interpretation of images, a single criterion is clearly insufficient. The human brain, furnished with its a priori knowledge and enormous memory of real world subjects and scenarios, combines different subjective criteria in order to give an assessment of the interesting or primary subject(s) in a scene. The following extensive list of features are believed to have influences on the human brain in performing such a somewhat intangible task as main subject detection: location, size, brightness, colorfulness, texturefulness, key subject matter, shape, symmetry, spatial relationship (surroundedness/occlusion), borderness, indoor/outdoor, orientation, depth (when applicable), and motion (when applicable for video sequence).

The low-level early vision features include color, brightness, and texture. The geometric features include location (centrality), spatial relationship (bordemess, adjacency, surroundedness, and occlusion), size, shape, and symmetry. The semantic features include skin, face, sky, grass, and other green vegetation. Those skilled in the art can define more features without departing from the scope of the present invention. More details of the main subject detection algorithm are provided in U.S. Pat. No. 6,282,317, which is incorporated herein by reference.

The aforementioned version of the main subject detection algorithm is computationally intensive and alternative versions may be used that base subject detection on a smaller set of subject-related features. Since all of the composition measures considered here are with respect to the main subject belief map, it is feasible to concentrate the system on the most computationally effective aspects of these measures, such as aspects bearing mostly on the "centrality" measure. These aspects are considered in judging the main subject, thereby reducing the overall computational complexity at the expense of some accuracy. It is a useful property of the Bayesian Network used in the main subject detection algorithm that features can be excluded in this way without requiring the algorithm to be retrained. Secondly, it takes advantage of the fact that images supplied to main subject detector 50 are known to be oriented right-side-up. The subject-related features associated with spatial location of a region within the scene can be modified to reflect this knowledge. For example, without knowing scene orientation the main subject detector 50 assumes a center-weighted distribution of main subject regions, but with known orientation a bottom-center-weighted distribution may be assumed.

Referring to FIG. 3, after the main subject belief map has been computed in the main subject detector 50, it is segmented in a clustering stage 31 into three regions using k-means clustering of the intensity values. The three regions correspond to pixels that have high probability of being part of the main subject, pixels that have low probability of being part of the main subject, and intermediate pixels. Based on the quantized map, the features of main subject size, centrality, compactness, and interest (variance) are computed as described below in reference to FIGS. 5A–5D.

Main Subject Variance

One way to characterize the contents of a photograph is by how interesting it is. For the purpose of emphasis image selection, an image with the following characteristics might be considered interesting.

the main subject is interesting in and of itself, by virtue of its placement in the frame.

the main subject constitutes a reasonably large area of the picture, but not the entire frame.

the background does not include isolated objects that can distract from the main subject.

Figure 5A:
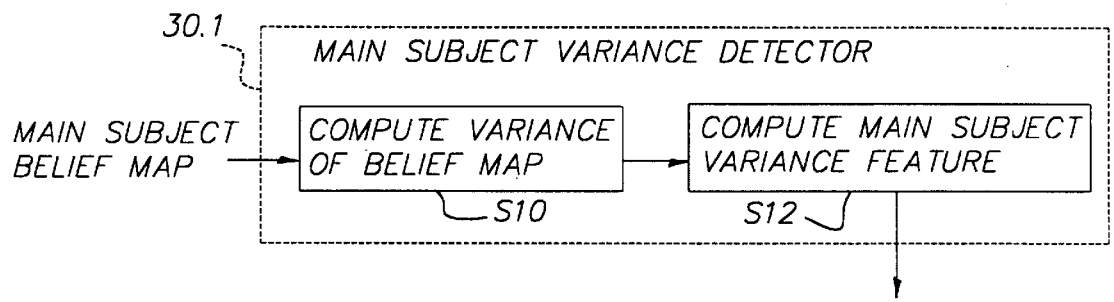

An estimate of the interest level of each image is computed by estimating the variance in the main subject map. This feature is primarily valuable as a counterindicator: that is, uninteresting images should not be the emphasis image. In particular, and as shown in FIG. 5A, the main subject variance detector 30.1 implements the following steps for computing main subject variance. Initially, in step S10, the statistical variance v of all main subject belief map values is computed. In step S12, the main subject variance feature y is computed according to the formula:

$$y=\min(1,2.5*\mathrm{sqrt}(v)/127.5)$$

Main Subject Centrality

The main subject centrality is computed as the distance between the image center and the centroid of the high probability (and optionally the intermediate probability) region(s) in the quantized main subject belief map. In particular, and as shown in FIG. 5B, the main subject centrality detector 30.2 implements the following steps for computing main subject centrality. Initially, in step S20, the pixel coordinates of the centroid of the highest-valued cluster is located. In step S22, the Euclidean distance j from the center of the image to the centroid is computed. In step S24, the normalized distance k is computed by dividing j by the number of pixels along the shortest side of the image. In step S26, the main subject centrality feature m is computed according to the formula:

$$m=\min(k,1)$$

Main Subject Size

Figure 5C:
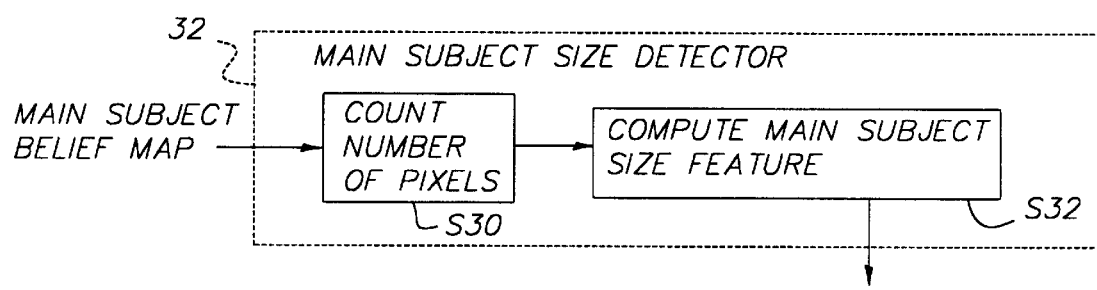

The size of the main subject is determined by the size of the high probability (and optionally the intermediate probability) region(s) in the quantized main subject belief map. It is expressed as the percentage of the central area (25% from border) that is occupied by the high (and optionally the intermediate) probability region. In particular, and as shown in FIG. 5C, the main subject size detector 32 implements the following steps for computing main subject size. Initially, in step S30, the number of pixels f in the intersection of the highest-valued cluster and the rectangular central ¼ of the image area is counted. In step S32, the main subject size feature g is computed according to the formula:

$$g=f/N$$

where N is the total number of image pixels.

Main Subject Compactness

The compactness of the main subject is estimated by computing a bounding rectangle for the high probability (and optionally the intermediate probability) region(s) in the quantized main subject belief map, and then examining the percentage of the bounding rectangle that is occupied by the main subject. In particular, and as shown in FIG. 5D, the main subject compactness detector 30.3 implements the following steps for computing main subject compactness. Initially, in step S40, the number of pixels a in the highest-valued cluster is counted. In step S42, the smallest rectangular box which contains all pixels in the highest-valued cluster (the bounding box) is computed, and in step S44 the area b of the bounding box, in pixels, is calculated. In step S46, the main subject compactness feature e is determined according to the formula:

$$e = \min(1, \max(0, 2*(a/b - 0.2)))$$

where e will be a value between 0 and 1, inclusive.

Classification Stage

The feature quantities generated according to the algorithms set forth above are applied to the classification stage 14, which is preferably a reasoning engine that accepts as input the self-salient and/or the relative-salient features and is trained to generate image assessment (emphasis and appeal) values. Different evidences may compete or reinforce each according to knowledge derived from the results of the ground truth study of human observers-evaluations of real images. Competition and reinforcement are resolved by the inference network of the reasoning engine. A preferred reasoning engine is a Bayes network.

A Bayes net (see, e.g., J. Pearl, *Probabilistic Reasoning in Intelligent Systems*, San Francisco, Calif.: Morgan Kaufmann, 1988) is a directed acyclic graph that represents causality relationships between various entities in the graph, where the direction of links represents causality relationships between various entities in the graph, and where the direction of links represents causality. Evaluation is based on knowledge of the Joint Probability Distribution Function (PDF) among various entities. The Bayes net advantages include explicit uncertainty characterization, efficient computation, easy construction and maintenance, quick training, and fast adaptation to changes in the network structure and its parameters. A Bayes net consists of four components:

- Priors: The initial beliefs about various nodes in the Bayes net.
- Conditional Probability Matrices (CPMs): Expert knowledge about the relationship between two connected nodes in the Bayes net.
- Evidences: Observations from feature detectors that are input to the Bayes net.
- Posteriors: The final computed beliefs after the evidences have been propagated through the Bayes net.

The most important component for training is the set of CPMs, shown as CPM stages 15.1 . . . 15.9 in FIG. 1 (and 15.1 . . . 15.7 in FIG. 2) because they represent domain knowledge for the particular application at hand. While the derivation of CPMs is familiar to a person skilled in using reasoning engines such as a Bayes net, the derivation of an exemplary CPM will be considered later in this description.

Referring to FIGS. 1 and 2, a simple two-level Bayes net is used in the current system, where the emphasis (or appeal) score is determined at the root node and all the feature detectors are at the leaf nodes. It should be noted that each link is assumed to be conditionally independent of other links at the same level, which results in convenient training of the entire net by training each link separately, i.e., deriving the CPM for a given link independent of others. This assumption is often violated in practice; however, the independence simplification makes implementation feasible and produces reasonable results. It also provides a baseline for comparison with other classifiers or reasoning engines.

Probabilistic Reasoning

All the features are integrated by a Bayes net to yield the emphasis or appeal value. On one hand, different evidences may compete with or contradict each other. On the other hand, different evidences may mutually reinforce each other according to prior models or knowledge of typical photographic scenes. Both competition and reinforcement are resolved by the Bayes net-based inference engine.

Figure 10:
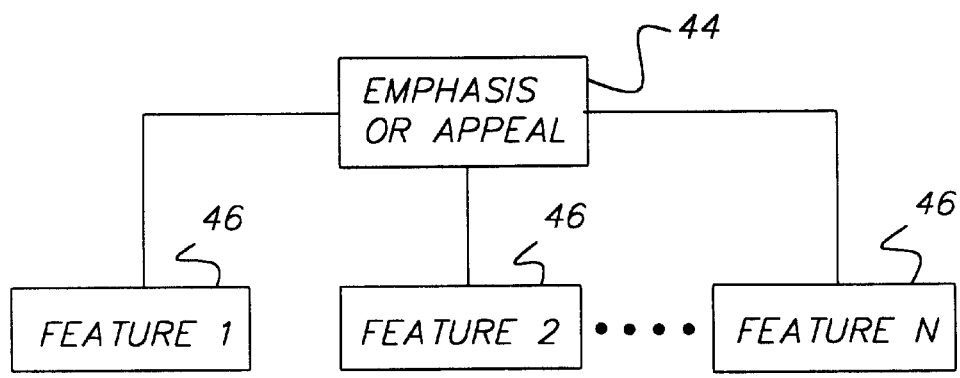
FIG. 10 is a diagram of a two level Bayesian net used in the networks shown in FIGS. 1 and 2.

Referring to FIG. 10, a two-level Bayesian net is used in the present invention that assumes conditional independence between various feature detectors. The emphasis or appeal value is determined at the root node 44 and all the feature detectors are at the leaf nodes 46. There is one Bayes net active for each image. It is to be understood that the present invention can be used with a Bayes net that has more than two levels without departing from the scope of the present invention.

Training Bayes Nets

One advantage of Bayes nets is each link is assumed to be independent of links at the same level. Therefore, it is convenient for training the entire net by training each link separately, i.e., deriving the CPM 15.1 . . . 15.9 for a given link independent of others. In general, two methods are used for obtaining CPM for each root-feature node pair:

1. Using Expert Knowledge

This is an ad-hoc method. An expert is consulted to obtain the conditional probabilities of each feature detector producing a high or low output given a highly appealing image.

2. Using Contingency Tables

This is a sampling and correlation method. Multiple observations of each feature detector are recorded along with information about the emphasis or appeal. These observations are then compiled together to create contingency tables which, when normalized, can then be used as the CPM 15.1 . . . 15.9. This method is similar to neural network type of training (learning). This method is preferred in the present invention.

Consider the CPM for an arbitrary feature as an example. This matrix was generated using contingency tables derived from the ground truth and the feature detector. Since the feature detector in general does not supply a binary decision (referring to Table 1), fractional frequency count is used in deriving the CPM. The entries in the CPM are determined by $$CPM = \left[ \left( \sum_{i \in I} \sum_{r \in R_i} n_i F_r^T T_r \right) P \right]^T \tag{14}$$

$$F_r = [f_0^r f_1^r \ldots f_M^r], \; T_r = [t_0^r t_1^r \ldots t_L^r],$$

$$P = \text{diag}\{p_j\}, \; p_j = \left( \sum_{i \in I} \sum_{r \in R_i} n_i t_r \right),$$

where I is the set of all training image groups, $R_i$ is the set of all images in group i, $n_i$ is the number of observations (observers) for group i. Moreover, $F_r$ represents an M-label feature vector for image r, $T_r$ represents an L-level ground-truth vector, and P denotes an L×L diagonal matrix of normalization constant factors. For example, in Table 1, images 1, 4, 5 and 7 contribute to boxes 00, 11, 10 and 01 in Table 2, respectively. Note that all the belief values have been normalized by the proper belief sensors. As an intuitive interpretation of the first column of the CPM for centrality, an image with a high feature value is about twice as likely to be highly appealing than not.

TABLE 1

An example of training the CPM.

| Image Number | Ground Truth | Feature Detector Output | Contribution |
|---|---|---|---|
| 1 | 0 | 0.017 | 00 |
| 2 | 0 | 0.211 | 00 |
| 3 | 0 | 0.011 | 00 |
| 4 | 0.933 | 0.953 | 11 |
| 5 | 0 | 0.673 | 10 |

TABLE 1-continued

An example of training the CPM.

| Image Number | Ground Truth | Feature Detector Output | Contribution |
|---|---|---|---|
| 6 | 1 | 0.891 | 11 |
| 7 | 0.93 | 0.072 | 01 |
| 8 | 1 | 0.091 | 01 |

TABLE 2

The trained CPM.

| | Feature = 1 | feature = 0 |
|---|---|---|
| Emphasis or Appeal = 1 | 0.35 (11) | 0.65 (01) |
| Emphasis or Appeal = 0 | 0.17 (10) | 0.83 (00) |

While the invention has been described for use with a Bayes net, different reasoning engines may be employed in place of the Bayes net. For example, in *Pattern Recognition and Neural Networks* by B. D. Ripley (Cambridge University Press, 1996), a variety of different classifiers are described that can be used to solve pattern recognition problems, where having the right feature is normally the most important consideration. Such classifiers include linear discriminant analysis methods, flexible discriminants, (feedforward) neural networks, non-parametric methods, tree-structured classifiers, and belief networks (such as Bayesian networks). It will be obvious to anyone of ordinary skill in such methods that any of these classifiers can be adopted as the reasoning engine for practice of the present invention.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention.

PARTS LIST

| 10 | image assessment network |
| 12 | feature extraction stage |
| 14 | classification stage |
| 16 | comparator stage |
| 18 | normalization stage |
| 20 | skin area detector |
| 22 | close-up detector |
| 24 | people detector |
| 26 | skin detector |
| 28 | face detector |
| 30 | composition detector |
| 30.1 | main subject variance algorithm |
| 30.2 | main subject centrality algorithm |
| 30.3 | main subject compactness algorithm |
| 31 | clustering stage |
| 32 | subject size detector |
| 34 | main subject detector |
| 36 | sharpness detector |
| 38 | colorfulness detector |
| 40 | unique format detector |
| 42 | representative color detector |
| 44 | root node |
| 46 | leaf node |
| 50 | main subject detector |
| 52 | clustering stage |
| 110 | image capture device |
| 120 | digital image processor |
| 122 | enhancement transform module |
| 130 | image output device |
| 140 | general control computer |
| 150 | monitor device |
| 160 | input control device |
| 170 | computer memory device |
| 180 | print attribute controller |
| 190 | computer system |

What is claimed is:

1. A method for varying one or more print attributes of a print made from a digital image, said method comprising the steps of:
    (a) receiving a group of digital images;
    (b) computing a print attribute value for each digital image based on a determination of the degree of importance, interest or attractiveness of each digital image relative to other digital images in the group of digital images; and
    (c) using the print attribute value to control a print attribute of the print made from each digital image in the group of digital images.

2. The method as claimed in claim 1 wherein the print attribute is at least one of the number of prints made of the image, the size of a print made from the image, and the magnification factor used for the image.

3. The method as claimed in claim 1 wherein the print attribute value is based on an appeal value determined from the degree of importance, interest or attractiveness that is intrinsic to the image.

4. The method as claimed in claim 1 wherein the image is one of a group of digital images and the print attribute value is based on an emphasis value determined from the degree of importance, interest or attractiveness of the image relative to other images in the group of images.

5. The method as claimed in claim 1 wherein the method for the determination of the degree of importance, interest or attractiveness of the image is based on an assessment of the image with respect to certain features, comprising the further steps of:
    (c) computing one or more quantities related to one or more features in the digital image, including one or more features pertaining to the content of the digital image;
    (d) processing said one or more quantities with a reasoning algorithm that is trained on the opinions of one or more human observers; and
    (e) providing an output from the reasoning algorithm that assesses the image.

6. The method as claimed in claim 5 wherein the features pertaining to the content of the digital image include at least one of people-related features and subject-related features.

7. The method as claimed in claim 5 wherein step (c) further includes computing one or more quantities related to one or more objective features pertaining to objective measures of the digital image.

8. The method as claimed in claim 7 wherein the objective features include at least one of colorfulness and sharpness.

9. The method as claimed in claim 5 wherein the reasoning algorithm in step (d) is trained at least in part from ground truth studies of candidate images.

10. The method as claimed in claim 5 wherein the reasoning algorithm is a Bayesian network.

11. A web-based method useful in a client-server host configuration for varying one or more print attributes of a print made from a digital image, said method comprising the steps of:

(a) establishing a network connection between the client host and the server host;

(b) receiving a group of digital images;

(c) computing a print attribute value for each digital image at the client host based on a determination of the degree of importance, interest or attractiveness of the digital image relative to other digital images in the group of digital images; and (d) using the print attribute value at the server host to control the print attribute of a print made from each digital image in the group of digital images.

12. The method as claimed in claim 11 wherein the print attribute is at least one of the number of prints made of the image, the size of a print made from the image, and the magnification factor used for the image.

13. A web-based method useful in a client-server host configuration for varying one or more print attributes of a print made from a digital image, said method comprising the steps of (a) establishing a network connection between the client host and the server host;

(b) receiving a group of digital images;

(c) initiating functionality within a web browser at the client host for computing a print attribute value for each digital image based on a determination of the degree of importance, interest or attractiveness of each digital image relative to other digital images in the group of digital images; and (c) initiating a web server at the server host for using the print attribute value to control the print attribute of a print made from each digital image in the group of digital images.

14. The method as claimed in claim 13 wherein the print attribute is at least one of the number of prints made of the image, the size of a print made from the image, and the magnification factor used for the image.

15. A computer program product for varying one or more print attributes of a print made from a digital image, said program product comprising:

a computer readable storage medium having a computer program stored thereon for performing the steps of:

(a) receiving a group of digital images;

(b) computing a print attribute value for each digital image based on a determination of the degree of importance, interest or attractiveness of each digital image relative to other digital images in the group of digital images; and (c) using the print attribute value to control a print attribute of the print made from each digital image in the group of digital images.

16. The computer program product as claimed in claim 15 wherein the print attribute is at least one of the number of prints made of the image, the size of a print made from the image, and the magnification factor used for the image.

17. The computer program product as claimed in claim 15 wherein the print attribute value is based on an appeal value determined from the degree of importance, interest or attractiveness that is intrinsic to the image.

18. The computer program product as claimed in claim 15 wherein the image is one of a group of digital images and the print attribute value is based on an emphasis value determined from the degree of importance, interest or attractiveness of the image relative to other images in the group of images.

19. A system for varying one or more print attributes applied to prints made from a group of digital images, said system comprising:

(a) a processing stage for computing a print attribute value for each digital image based on a determination of the degree of importance, interest or attractiveness of each digital image relative to other digital images in the group of digital images;

(b) an image output device producing the prints; and (c) a controller stage using the print attribute value to control one or print attributes applied to the prints made by the image output device for each digital image in the group of digital images.

20. The system as claimed in claim 19 wherein the print attribute is at least one of the number of prints made of the digital image, the size of a print made from the digital image, and the magnification factor used for the digital image.

21. The system as claimed in claim 19 wherein the print attribute value is based on an appeal value determined by the processing stage from the degree of importance, interest or attractiveness that is intrinsic to the digital image.

22. The system as claimed in claim 19 wherein the print attribute value is based on an emphasis value determined by the processing stage from the degree of importance, interest or attractiveness of the digital image relative to other digital images in the group of digital images.

* * * * *